United States Patent [19]
Laine

[11] Patent Number: 5,864,144
[45] Date of Patent: Jan. 26, 1999

[54] INFRARED RADIATION EMITTING DEVICE

[75] Inventor: Derek Charles Laine, Staffordshire, United Kingdom

[73] Assignee: Keele University, Staffordshire, United Kingdom

[21] Appl. No.: 817,526

[22] PCT Filed: Oct. 17, 1995

[86] PCT No.: PCT/GB95/02446

§ 371 Date: Jun. 9, 1997

§ 102(e) Date: Jun. 9, 1997

[87] PCT Pub. No.: WO96/12165

PCT Pub. Date: Apr. 25, 1996

[30] Foreign Application Priority Data

Oct. 18, 1994 [GB] United Kingdom .................... 9420954

[51] Int. Cl.$^6$ ....................................................... H05B 3/20
[52] U.S. Cl. ................................. 250/504 R; 250/443.1; 250/495.1
[58] Field of Search ........................... 250/504 R, 493.1, 250/495.1

[56] References Cited

U.S. PATENT DOCUMENTS

| | | | |
|---|---|---|---|
| 2,827,539 | 3/1958 | Smith et al. | 219/34 |
| 3,633,059 | 1/1972 | Nishizawa | 313/108 D |
| 4,620,104 | 10/1986 | Nordal et al. | 250/493.1 |
| 4,644,141 | 2/1987 | Hagen et al. | 219/543 |
| 4,724,356 | 2/1988 | Daehler | 250/495.1 |
| 4,859,080 | 8/1989 | Titus et al. | 374/134 |
| 4,859,859 | 8/1989 | Knodle et al. | 250/504 R |
| 4,922,116 | 5/1990 | Grinberg et al. | 250/495.1 |
| 5,128,514 | 7/1992 | Lehmann et al. | 219/209 |
| 5,220,173 | 6/1993 | Kanstad | 250/493.1 |

FOREIGN PATENT DOCUMENTS

WO 83/03001   9/1983   WIPO .

OTHER PUBLICATIONS

Driggers et al., "Review of infrared scene projector technology–1993", Optical Engineering, vol. 33, No. 7, pp. 2408–2416, Jul. 1994.

Bokhan, P.A., "Experiment on optical pumping of a carbon dioxide molecular laser," UDC 621.373:535(206.3) pp. 826–827, received Jun. 6, 1971.

Primary Examiner—Jack I. Berman
Attorney, Agent, or Firm—Woodard, Emhardt, Naughton, Moriarty & McNett

[57] ABSTRACT

An infrared (IR) radiation emitting device comprises a sinuous foil resistive element (1) which emits IR radiation when heated by an electric current. The device is configured so that the resistive element (1) emits radiation with a spatial intensity which substantially possesses a single axis. The resistive element (1) may, for example, be configured as a substantially planar spiral (3).

17 Claims, 3 Drawing Sheets

INFRARED RADIATION EMITTING DEVICE

The present invention relates to an infra-red (IR) radiation emitting device, particularly, but not exclusively, a device adapted for producing pulsating IR radiation.

IR radiation is used in a wide variety of applications and there are a number of known IR emitting devices. Such known devices include lasers, semiconductor IR emitting diodes and electrically heated elements which emit IR radiation when hot.

For certain applications, such as infra-red spectroscopy, for which pulsating IR radiation over a wide band of wavelengths (e.g. 1 $\mu$m to 10 $\mu$m) is desirable, a number of pulse emitting devices have been developed. Such devices can broadly be separated into two general types: firstly devices in which a constant temperature source is used and variations in the radiated IR intensity are obtained by means of mechanically interrupting the radiation emitted from the source, such as Nernst and Globar radiators; and secondly devices that can produce pulsating radiation directly such as filament lamps (e.g. tungsten, Ni/Cr or Pt filaments which can operate at around 5 Hz to 10 Hz but have output wavelengths below a value of about 5 mm by the filament enclosure transmission characteristics) and devices which comprise a thin conductive film supported on a substrate and which produce pulsed IR radiation by pulsating the heating current supplied to the film.

Examples of the latter type of device are described in PCT Application Nos. WO83/03001 and WO90/14580. In particular WO90/14580 describes a device for emitting pulsed IR radiation which includes a source comprising an electrically conducting plate like thin film (typically less than 4 $\mu$m tick) supported on a thin insulating substrate. The source is described as being able to produce larger temperature contrasts and smaller time constants (i.e. faster pulse times) than had previously been known with existing thin film sources. This is achieved through radiative cooling of the source which is much more rapid than conductive cooling as had been relied upon in previous tin film sources. That is, the films proposed are so thin that the majority of the heat energy generated in the film during current ON-pulse time is lost through IR radiation so that the heat retained by the film is significantly less than the heat energy put into the film.

A number of alternative materials which could be used for construction of the conductive film are proposed in WO90/14580, including combinations of nickel, chromium and iron and the higher emissivity oxides of their alloys. However, in all cases the sources disclosed in WO90/14580 suffer disadvantages as a result of the thin conducting film being deposited on a substrate. That is, differences in the thermal characteristics of the thin conductive film material and substrate material can lead to mechanical failure under the thermal stresses resulting from repeated heating and cooling.

The paper entitled "Experiment on Optical Pumping of a Carbon Dioxide Molecular Laser" by P. A. Rokhan (Optics and Spectroscopy, April 1972, Volume 32, page 435) discloses the use of a molybdenum foil (not deposited on a substrate) to produce pulses of infra-red radiation for the specific purpose of exciting a $CO_2$ laser. A strip 7 m in length, 40 mm in width and 0.02 mm in thickness, is wound in a helix around a quartz-laser tube. However, the foil source requires a large electrical supply current (derived from a bank of capacitors) to heat it to the required temperature. The device is not particularly adapted to produce rapid pulsing as for example in the thin film sources discussed above that can be operated at frequencies of the order of 100 Hz).

In addition, the arrangement is clearly unsuitable for applications in which much smaller centralised sources are required. For instance, even if a relatively small section of the foil is used, for example of the order of 5 mm square, the heating current must still be relatively large (as compared with the currents required for driving the thin film sources discussed above) and could not readily be matched to the requirements of, for example, transistorised control circuitry. Moreover, the combined thermal capacity of the foil and its mechanical supporting structure would be significantly higher than that of the thin films discussed above so that rapid cooling, and thus rapid high contrast pulsing, is unlikely to be achievable.

Unsupported foils of the order of thickness of the thin films proposed in WO90/14580, discussed above, are impractical as they are very difficult to mount and will buckle when heated to the required high temperatures.

It is an object of the present invention to obviate or mitigate the above disadvantages.

According to a first aspect of the present invention there is provided an infra-red (IR) radiation emitting device, comprising a resistive element which emits IR radiation when heated by an electric current, the device being adapted to emit radiation with a spatial intensity which substantially possesses a single axis, wherein the resistive element comprises a sinuous foil ribbon.

For the avoidance of doubt, the reference to the spatial intensity of the emitted radiation is to be understood as a reference to the power of the emitted radiation per unit solid angle and thus is representative of the directional distribution of the radiation emitted from the device. The property may also be referred to as the "radiant intensity".

For instance, devices according to the present invention which have a substantially planar resistive element will have a radiant intensity close to Lambertian (in the absence of any additional focusing means). For example, for a planar element which emits radiation from both sides the radiant intensity is substantially a figure of eight having a single axis, i.e. the axis of circular symmetry, extending perpendicularly to the plane of the element. It will be appreciated that the radiation maxima will lie along the axis.

The device according to the present invention does not have the disadvantages of the known supported film sources and yet is capable of rapid beating and radiative cooling. If used to produce continuous pulses of IR radiation the device can operate at relatively high frequencies with significant thermal contrast.

The foil thickness may typically vary from about 5 $\mu$m to 25 $\mu$m.

Preferably the sinuous ribbon element is linked to a support structure via two or more supporting electrodes which conduct current to and from the element, each end of the ribbon having at least one electrode associated therewith, such that a significant degree of thermal isolation is maintained between the sinuous ribbon element and said support structure. This has the effect of improving the thermal contrast of the sinuous ribbon element between heating and cooling cycles when operated to produce pulsed radiation.

Preferably the temperature gradient along the electrodes is initially steep and decreases gradually in a direction away from the sinuous ribbon element. This advantageously minimises any thermally induced mechanical stresses in the element and electrodes.

The supporting electrodes are preferably elongate and taper outwardly away from the sinuous ribbon element. The elongate form improves the thermal isolation of the element from the support and the tapering reduces local resistive heating in the electrodes with distance from the ribbon element.

Preferably the supporting electrodes are foil electrodes formed integrally with the sinuous ribbon element. This obviates the need for mechanical connections between the electrodes and the element.

The support structure is preferably electrically insulated.

In a preferred embodiment of the device the sinuous ribbon element is spiralled and preferably configured as a bi-spiral.

The bi-spiral configuration allows electrodes to be linked to the perimeter of the element only thereby enabling the greatest possible temperature excursion per electrical pulse with the minimum thermal capacity. Moreover, its essentially non-inductive construction reduces unwanted current produced magnetic field effects such as magnetic forces and magnetic induction.

For many applications of the device, the sinuous ribbon element preferable lies in substantially the same plane along substantially all of its length.

Alternatively, the element may be spiralled and dished, or conical, so as to form a cavity source which approximates a black body emitter.

A reflective member (which may, for example, be planar or dished) may be positioned on one side of the sinuous ribbon element to reflect IR radiation emitted from one side of element back in the general direction of the radiation emitted from the other side of the element.

Various materials may be used for the foil, non-exhaustive examples of which are given in the description below. The materials may be provided with a coating of high thermal emissivity such as, for instance, a metal blacks one or more metal oxides (as in a Nernst glower) or a silicate. Alternatively, the surface of the foil could be textured to give improved emissivity.

A plurality of the devices may be combined in a compact array which broadens the range of uses to which the device may applied, as discussed in the description below.

According to a second aspect of the present invention there is provided a method of fabricating an infra-red radiation emitting device, comprising etching or otherwise cutting one or more sinuous resistive ribbon elements from a thin sheet of electrically conducting foil, the or each element providing a source of infra-red radiation when heated by an applied electric current.

Specific embodiments of the present invention will now be described, by way of example only, with reference to the accompanying drawings, in which.

Figure 1:
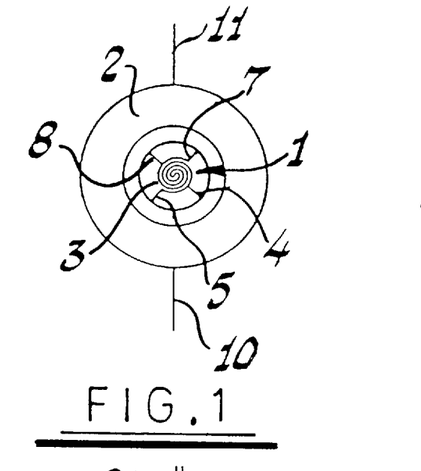
FIGS. 1 and 2 illustrate an IR emitting device in accordance with a first embodiment of the present invention.
Figure 2:
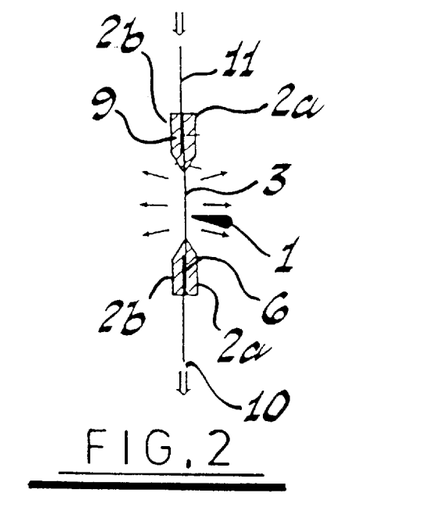

Referring to FIGS. 1 and 2, the illustrated IR radiation emitting device comprises a conductive foil element 1 mounted centrally within a ringed electrically insulating ceramic (or other insulating material) support 2. Possible materials for fabricating the foil element 1 are discussed in detail below.

Figure 3:
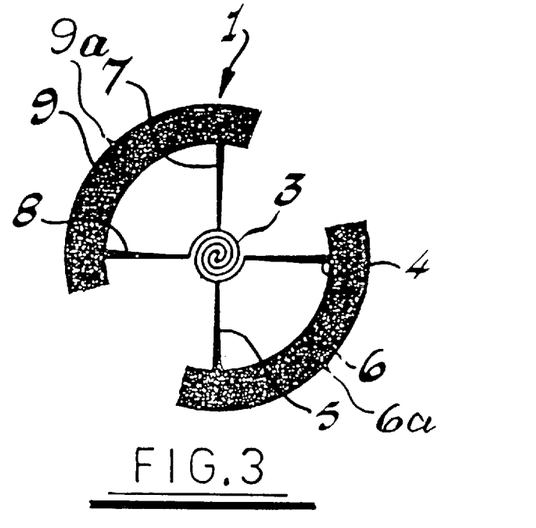
FIG. 3 illustrates a source element of the device of FIGS. 1 and 2.

As illustrated in FIG. 3, which shows the foil element 1 in isolation from the support 2, the foil element 1 is planar and comprises a central bi-spiral resistive track 3 one end of which is linked by two electrode portions 4 and 5 to an arcuate portion 6, and the other end of which is linked by two electrode portions 7 and 8 to an arcuate portion 9. Each of the electrode portions 4, 5, 7 and 8 tapers outwardly away from the bi-spiral 3.

Referring again to FIGS. 1 and 2, the arcuate portions 6 and 9 of the foil element 1 are secured between two halves 2a and 2b of the support 2 by gluing or other suitable fixing means. Current supply wires 10 and 11 are electrically connected, for instance by spot welding, to the arcuate portions 6 and 9 respectively at radial positions marked by protuberances 6a and 9a respectively. It will be appreciated that there are many ways in which the current to the device could be controlled and thus such details are not discussed here.

In accordance with the present invention the foil element 1 may be etched or cut from a foil sheet; various cutting or etching methods may be used. For instance chemical etching, laser or ion electron beam cutting, or spark erosion could be used. Chemical etching has the advantage of low cost where elements are to be constructed in low volumes, whereas laser or ion or electron beam, cutting (preferably computer controlled) or spark erosion is more suitable for accurate bulk production. Moreover, the non-chemical methods can be used on a wider range of foil materials than is possible with chemical etching. For instance, chemically etching is inappropriate if the element is to be constructed from a chemically resistive foil material such as platinum or tantalum.

It is preferable to form the element with the two arcuate portions 6 and 9 initially connected in a ring surrounding the bi-spiral. Sections of the ring can be cut, or etched, away once the element has been fixed to one half of the support 2 to leave the arcuate portions 6 and 9. This eases handling of the element prior to fixing to the support and helps to preserve the bi-spiral and planar geometry of the element until it is firmly fixed in position.

The desired thickness of the foil and size of the element 1 may vary for different applications. Typically, the thickness of the foil element may range from about 5 $\mu$m to about 25 $\mu$m and the element, using this fabrication method, may be as small as 1 mm or so in diameter. The diameter of the element may be even smaller if special fabrication techniques are used, for example employing ion/electron beam cutting.

In use, heating current pulses are supplied to the bi-spiral 3 via the arcuate portions 6 and 9 and the electrode portions 4,5,7 and 8. The bi-spiral 3 provides a circularly symmetrical and localised source of infra-red radiation. As a result of the central bi-spiral portion's small physical size it will have a low thermal capacity allowing for rapid heating and cooling and can thus be used to generate relatively rapid IR pulses with high thermal contrast. In addition, only a relatively small exciting current is required, which current can readily be matched to digital control components. For example, a 6 mm diameter bi-spiral of 20 mm thickness requires typically a current pulse of 3.6 amps, of 2 ms pulse duration for 10 Hz operation of a 6.5 ohm device producing temperature excursions of up to about 900° C. to 1100° C. (depending on the foil material and whether or not a high emissivity coating is applied (see below)).

In addition to being compact and symmetrical, the planar bi-spiral configuration is also robust. Upon repeated heating and cooling the bi-spiral 3 will expand and contract by rotation about its axis and so any tendency to buckle out of plane will be reduced.

The bi-spiral configuration also aids uniform heating through the radiative heating effect adjacent turns of the bi-spiral have on one another, in conjunction with heat transfer by thermal conduction through the atmosphere.

Furthermore, because the bi-spiral 3, the electrode portions 4,5,7 and 8 and arcuate portions 6 and 9 are all formed integrally from a single sheet of foil there are no mechanical connections, such as welding points, which might fail through repeated thermal stressing. The only mechanical connections to the foil element 1 are those between the current supply wires 10 and 11 and the arcuate portions 6 and 9. However, the arcuate portions 6 and 9 are significantly thermally isolated from the bi-spiral 3 and are therefore not subjected to large variations in temperature. Moreover, there are no mechanical connections to the bi-spiral itself which might undesirably raise the thermal capacity of the bi-spiral.

The effective thermal isolation of the resistive track (the bi-spiral 3) from the surrounding support structure (i.e. the arcuate portions 6 and 9 and the mechanical support 2) is an important feature of the present invention. This thermal isolation is enhanced by the tapering of the electrodes 4,5,7 and 8 outwards from the bi-spiral 3 towards the arcuate portions 6 and 9 such that their ohmic resistance, and thus temperature, decrease with distance from the bi-spiral 3. In addition, the division of the supply current into two by the use of two supporting electrodes further reduces the local ohmic heating in the electrodes.

It will be appreciated that many changes could be made to the detailed structure described above, both of the foil element 1 and of the support 2. For instance, the configuration and relative proportions of the arcuate portions 6 and 9, the electrode portions 4,5,7 and 8 and the bi-spiral 3 could be varied.

Figure 4:
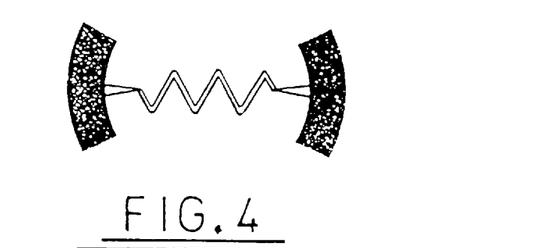
FIG. 4 illustrates an alternative source element to that of FIG. 3.

Similarly, the resistive track which defines the radiation source need not necessarily be formed as a circular bi-spiral but could take some other configuration. For example, the bi-spiral 3 could be generally oval or rectangular. Alternatively, the resistive track could be formed as a simple single substantially planar spiral, or as a meander line as shown in FIG. 4, or any other sinuous, but preferably compact, configuration.

However, not all possible configurations will have all the advantages of the bispiral configuration. For instance, a single spiral is not as robust as a bi-spiral. In addition, with a single spiral element it would not readily be possible to fabricate the element with an integral electrode connected to the centre of the spiral using the fabrication methods mentioned above. It may therefore be necessary to make some mechanical connection, such as a spot weld, at this central point to attach a current supply wire. Such a connection might form a potential point of mechanical weakness and undesirably increase the thermal capacity of the element. Moreover, should such a central connection effectively pin the spiral against rotation then thermal expansion of the spiral may cause it to distort out of plane.

It will be appreciated, however, that although alternative configurations such as a single spiral element may not have all the advantages of the bi-spiral configuration, they will still have advantages over the prior art discussed in the introduction to the specification.

Details of the other features of the element 1 could similarly be modified. For instance, only one, or more tan two, electrode portions could be used to link each end of the bi-spiral (or otherwise configured resistive track) with the arcuate portions 6 and 9. Using more than two electrodes leads to reduced ohmic heating in the electrodes at the expense of decreased thermal isolation of the bi-spiral from the surrounding support, but adds planar rigidity to the element 1.

In addition, whereas forming the bi-spiral 3, the electrodes 4,5,7 and 8, and the arcuate portions 6 and 9 as integral members (by the etching or cutting process discussed above) has advantages it will be appreciated that these features may be formed as separate components and then secured together for instance by spot welding, albeit that such a structure would have the disadvantages associated with such mechanical connections discussed above.

The structure of the element described above can readily be modified to emit infra-red radiation principally from one side only, with increased emissivity, by forming the bi-spiral 3 into a hollow cup or cone shape. The element may then closely approximate a black body cavity source. However, this does have a disadvantage that heat energy entrapment within the cone will slow down the radiative cooling process and thus the thermal contrast and pulse times that can be achieved.

Figure 5:
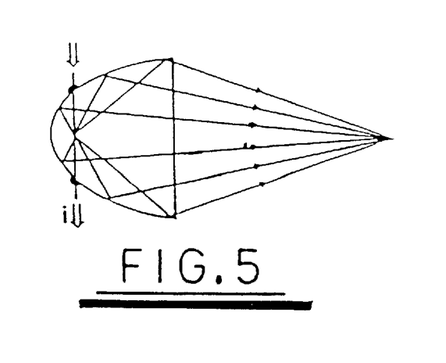
FIGS. 5 and 6 schematically illustrate second and third embodiments of the invention.
Figure 6:
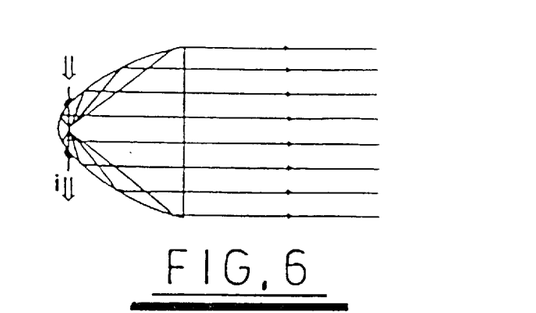

Alternatively, a reflective surface, such as a gold coated mirror, may be placed on one side of a planar element (e.g. the bi-spiral 3) to reflect radiation through the plane of the element and thus almost double the infra-red output on one side of the element. This does not have the heat entrapment disadvantage associated with the above described modification. However, it should be borne in mind that using more than four supporting electrodes (as mentioned above) will reduce the efficiency of reflection of radiation through the plane of the element (and electrodes). Furthermore, the use of concave mirrors, for example of spherical, ellipsoidal or parabolic geometry, can permit focusing or collimation of the emitted radiation. Two examples of the use of mirrors are illustrated schematically in FIGS. 5 and 6 respectively.

Figures 7A, 7B, 8A, 8B, 9, 10, 11:
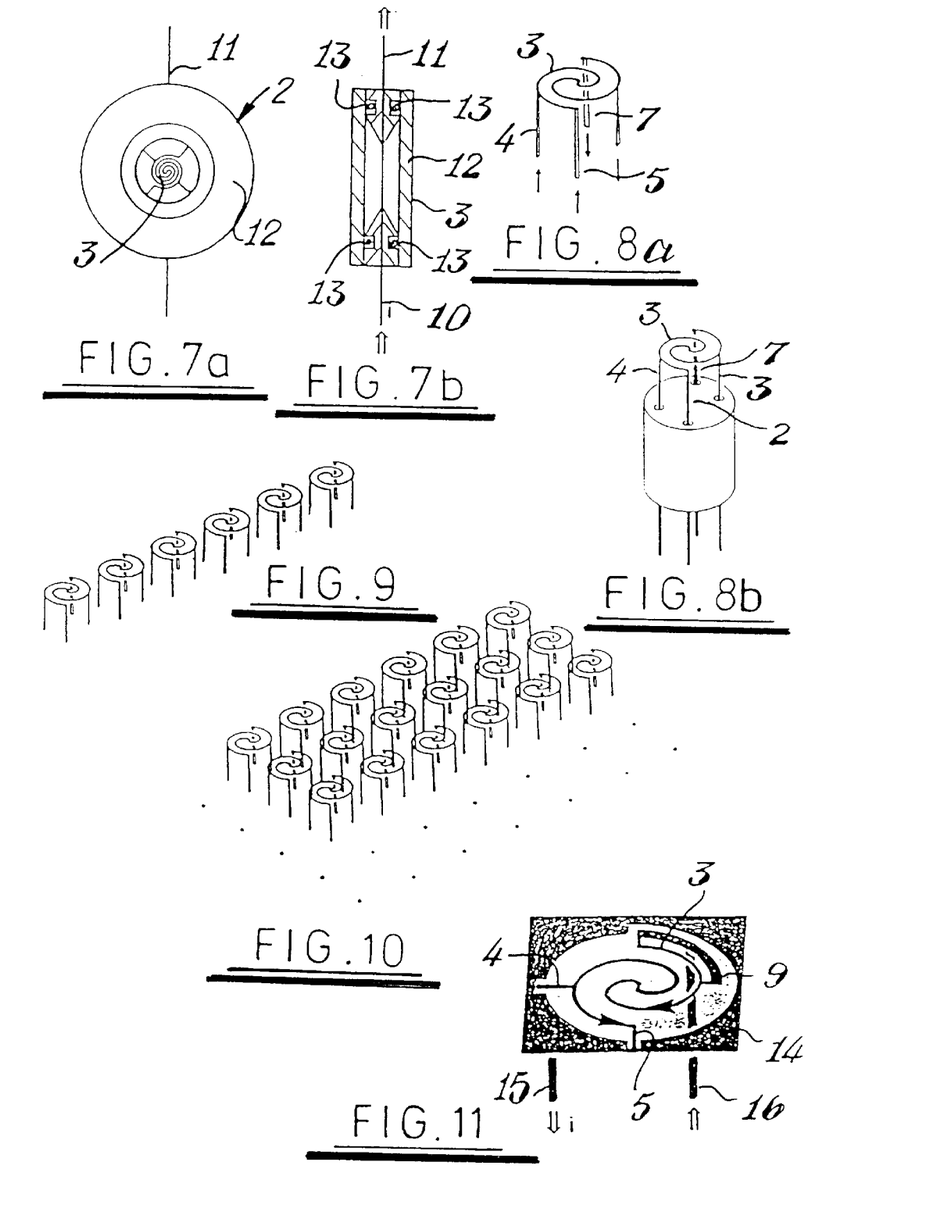
FIGS. 7a and 7b illustrate a modification of the device of FIGS. 1 and 2.
FIGS. 8a and 8b illustrate a modified source element.
FIGS. 9 and 10 illustrate schematically devices comprising arrays of elements of FIG. 8.
FIGS. 11 and 12 illustrate elements in accordance with a further embodiment of the invention.

For some applications it will be necessary to provide a device in which the radiation emitting element is isolated from the gaseous environment. For instance operation of a hot foil will be potentially hazardous in an atmosphere of explosive gases. In this case the element 1 can readily be encapsulated as illustrated in FIGS. 7a and 7b. The structure shown in FIG. 7a and 7b is substantially the same as that shown in FIGS. 1 and 2 but plates 12 of "window" material are fixed to either side of the ceramic support 2. O ring seals 13 are included to ensure a gas tight seal between the support 2 and the window plates 12.

A variety of materials could be used for the window plates 12, being in mind that the material must allow for rapid radiative cooling of the element 1. For instance a range of possible window materials are discussed in International Patent Application No. WO 90/14580. As suggested therein it is desirable that around 90% of the radiation from the element should be transmitted and that the windows should be transparent for a wavelength band in the region of 700 nm to 10 $\mu$m, or wider, if the element operates at 950° C. or greater. Moreover, to avoid window reflection, or window-to-window reflections, broad band and anti-reflection window coatings may be used. Suitable materials for this purpose are for example, zinc selenide, zinc sulphide, germanium, silicon, Irtran-4, Irtran-6, KRS-5, barium fluoride, calcium fluoride, potassium bromide and arsenic trisulphide.

A variety of gases could be used to fill the encapsulated unit which preferably should not be reactive or particularly radiation absorbing in the IR spectrum. For instance, a suitable gas would be nitrogen, argon or krypton. Inevitably there will be some heating of the gas within the encapsulated unit and if necessary this could be cooled by using, for example, a Peltier cooler.

It will be appreciated that other methods of encapsulation are possible. For example, the foil element could be sealed in an industrial standard TO5 or TO8 can, provided with an infra-red window (which may be of a standard industrial type such as sapphire or calcium fluoride. Connection of the foil element to such a can may be mate using pins or suitably shaped wires attached by any suitable means such as soldering, electrical spot welding, or laser welding.

Despite the relatively small size of industrial standard TO5 and TO8 cans, parabolic or similar mirror systems can be included to improve the directivity and forward emission intensity of the foil element. For instance, such a mirror could be press-fabricated from aluminium. It will, however, be appreciated that many other materials and methods could be used for mirror production.

The device, and the various modifications thereof, described above may be operated to emit a single pulse of IR radiation (one-shot operation), to emit a continuous series of radiation pulses (i.e. radiation of continuously varying intensity), or to continuously emit constant intensity radiation. For one-shot operation, the current verses time evolution can be profiled to give a particular response of infra-red output, taking advantage of the fast response time allowed by the emitter's structure. For instance, the current pulse might be typically 2 milliseconds long to give an IR pulse (100%) 14 ms and (63%) 4 ms rise time and a decay time to 37% of the peak value of less than 60 ms at 5 Hz for a 20 $\mu$m thick Fecralloy bi-spiral element.

For continuous pulse operation, the foil will not have time to cool fully in between pulses and thus the infra-red pulse amplitude decreases. Nevertheless, infra-red pulses can be obtained, albeit at relatively low amplitude, up to pulse frequencies of several kHz.

The accurate current control of the foil element can be effected, for example, by monitoring the temperature dependent foil resistance (which is a measure of the element (bi-spiral) temperature), by monitoring the infra-red output by means of an external infra-red detector, or even by detection of the pulsed low level sound emitted as a result of local heating of the air (or other gas) close to the element, using a microphone.

The infra-red sources according to the present invention may be used in a wide variety of applications. Possible known applications include infra-red spectroscopy and use in thermal printers. Other possible uses not previously suggested include anemometry of low velocity gases, For such an application the infra red source may be pulsed or continuously operated. In addition, pulsed operation enables A.C. amplifier methods to be used to monitor gas flow cooling of the source element. Where a bi-spiral (or similar configuration) is adopted for the element the device will be particularly suited for mounting in a pipe or other similar location for measuring the velocity of non-explosive gases or vapours.

A number of individual source elements may be arranged together in a multi element array which will be desirable for some applications such as in thermal printers and to provide a spectrally scanned source for use in spectroscopy.

An example of a source element configuration particularly suited for combining a number of individual source elements into an array is shown in FIG. 8a, which shows a bi-spiral element similar to that shown in FIGS. 1 and 2 but without the arcuate portions 6 and 9. The electrodes 4,5,7 and 8 are bent perpendicularly to the plane of the bi-spiral 3 so that they can function as support legs by way of which a plurality of the elements can be arranged to form an array such as is illustrated schematically in FIGS. 9 and 10. For convenience, each individual bi-spiral element could be supported by a ceramic rod as shown in FIG. 8b which has four bores to receive the electrodes 4, 5, 7 and 8 respectively (which function as support legs). Each of the support legs 4, 5, 7 and 8 may be attached to a respective wire electrodes threaded through the bores provided in the ceramic support rod and cemented or otherwise fixed in place.

For larger arrays it may be convenient to construct the whole array out of subunits of, for instance, 25 by 25 individual elements.

Figure 12:
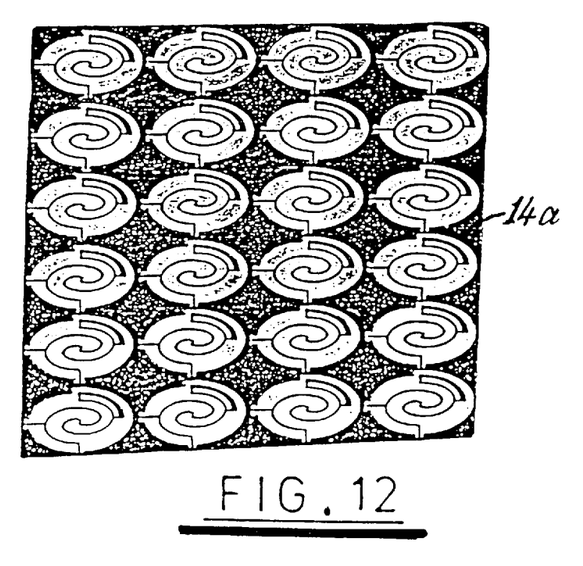

As an alternative, a matrix of individual source elements may be cut from a single sheet of foil as shown in FIG. 12. For ease of reference a single element unit is shown in FIG. 11, referring to which it will be seen that each individual element 14 is substantially the same as the element 1 of FIGS. 1 and 2. However, one of the arcuate portions, portion 6 say, is replaced by a square frame portion 14 which surrounds the bispiral 3 and the arcuate portion 9. An electrode 15 is spot welded to the square foil portion 14 and an electrode 16 is spot welded to the arcuate portion 9.

In the completed array, as shown in FIG. 12, the "square surround" associated with each element is defined by a single inter-spiral surrounding foil portion 14a. To avoid common-electrode electrical coupling between electrodes 15 associated with each element of the array (not shown in FIG. 12), all the connections made to the inter-spiral foil surround 14a may be strapped in parallel by means of a low resistance wire, or alternatively by coating the foil surround 14a with a low resistivity material, e.g. copper, by vacuum evaporation or electroplating.

The multi-element array of FIG. 12 has an advantage over the arrangement of FIGS. 9 and 10 in that it more readily allows for mass production. It will be appreciated that the configuration of the array could be modified; that is both details of individual elements and the manner in which the elements are arranged relative to one another could be varied. For instance, the individual elements could be more closely grouped by adopting a hexagonal arrangement.

In addition to the uses briefly mentioned above, a multi element array could also be used for the previously unsuggested uses of dynamic infrared targeting simulation and dynamic infrared scene generation. That is, by arranging individual source elements in a line (either curved or straight) then sequential electronic current pulsing of each element can simulate movement of an infrared source along that line, for example, the motion of a flare. Alternatively, individual source elements could be arranged in a two dimensional block and then by raster or other form of scanning a high temperature dynamic infra-red scene can be generated with contrast effected either by control of the magnitude of current pulses of fixed width, or a fixed current and variable width, applied in sequence to each individual source element. It will also be possible to combine essentially static scene generation with rapidly changing images simply by presenting update information to the source element array, thereby reducing the quantity of information required for representation of the changing image.

A variety of different types of thermal emitting foils might be used to form the elements. In all cases the emissivity of the material will be an important consideration. That is, for a body of any material its radiant emittance W is given by Stefan-Boltzmann's Law, i.e:

$$W = \epsilon \sigma Y^4$$

where σ is the Stefan-Boltzman constant
ε is the emissivity of the body
Y is the absolute temperature of the body
For a black body ε=1, but for all other bodies ε<1.

The choice of material may depend on a number of factors including the methods to be employed in constructing the element and also the application for which the IR emitting device is to be used. For instance, for some applications a stable wavelength-independent thermal emissivity as close to unity as possible may be required whereas for other applications a material with a spectral response which peaks at one or more selected wavelengths may be desirable. In addition, the material will preferably be able to withstand the high temperature operation and continued thermal stressing.

Additional desirable attributes of the foil material are as low a thermal capacity as possible whilst have a relatively high resistivity to enable the use of relatively low energising currents. Also, a low coefficient of expansion is desirable to reduce physical distortions and strains over repeated heating/cooling cycles as well as a low value of thermal conductivity to ensure the best possible thermal isolation between the resistive track (e.g. bi-spiral) and the surrounding support structure (e.g. the arcuate portions 6 and 9 and the electrically insulating support 2).

Some examples of possible foil materials are discussed in the prior art mentioned above and include, for instance, alloys containing iron and/or nickel and/or chromium which all have a high emissivity when oxidised, particularly at high temperatures. For instance, oxidised 20Ni-25Cr-55Fe (stainless steel) is claimed to have an emissivity as high as 0.97 at 500° C.

Platinum metal possesses desirable qualities as a foil material in that it has a small temperature coefficient of specific heat and is chemically inert. However, platinum metal has a relatively poor emissivity of the order of 0.08 at a wavelength of 5 nm at 1200° K and an emissivity of 0.25 at a wavelength of 1 $\mu$m, also at 1200° K. The emissivity can, however, be improved by application of a suitable coating such as a metal black, an oxide or a silicate, chosen for wide band (e.g. of the order of 1 mm to 10 nm wavelength range) emissivity and having suitable thermal stability. However, such coating does have a disadvantage in increasing response time.

Another limitation of platinum is that its resistivity is unfavourably low and chemical etching is difficult if not impossible. Laser or ion/electron beam cutting or spark erosion however remains a possibility for constructing the elements from platinum, and platinum does have the advantage that it is commercially available in very thin sheets, down to approximately 0.5 mm thickness.

Morever, platinum evaporates in air or oxygen above 1110° C. due to the formation of gaseous $PtO_2$. Thus above this temperature some form of encapsulation is necessary with, for example, a nitrogen or argon gas filling.

There are other commercially available materials which may be used to form the foil element, one group of which are referred to as heat resisting alloys stable for high temperature operations. These include the alloy Fe72.6/Cr22/A14.8/Si0.3/Y0.3, sold under the trade name Fecralloy, which can be used in air up to temperatures of 1100° C. to 1300° C. The material also has a high value of electrical resistivity of 134 $\mu\Omega$cm was against 10.58 $\mu\Omega$cm for platinum. Moreover, the thermal conductivity of Fecralloy is low at 11.5 $Wm^{-1}K^{+1}$ as compared with 71.6 $Wm^{+1}K^{-1}$ for platinum. The specific heat of Fecralloy at 460 $Jkg^{-1}K^{-1}$ at 20° C. and 700 $Jkg^{-1}K^{-1}$ at 800° C. is substantially higher than that for platinum (133 $Jkg^{-1}K^{-1}$ at 25° C.) but it does have a density of approximately three times less. At elevated temperatures in air, Fecralloy discolours as an oxide coating is created, which enhances thermal emissivity.

Other materials include various types of stainless steel (e.g. Fe/Cr18/Ni88/Ti which may be used in air at a temperature of up to 800° C.); Hastelloy (Ni57/Mo17/Cr16/Fe/W/Mn) which may be used in air at a temperature up to 1090° C., and has a high electrical resistivity of approximately 125 $\mu\Omega$cm, very similar to that of Fecralloy; nickel/chromium alloy (Ni80/Cr20) may be used up to temperatures of 1150° C. to 1250° C. and also has a low value of thermal conductivity (13.4 $Wm^{-1}K^{-1}$), and favourable electrical resistivity of 108 $\mu\Omega$cm.

It is well known that the emissivity of a surface is greatly affected by its physical condition. For example, a surface scoured by pits and scratches has a greater emissivity than a polished surface of the same material. This increase in emissivity is due to the so-called "cavity effect", i.e. that the effective emissivity of a cavity always exceeds that of its surfaces. Thus the emissivity of the foil element can be enhanced by roughening or texturing its surface. This can be achieved by forming dendritie or stalagmite structures on the surface by a variety of methods including chemical vapour disposition or ion bombardment.

Texturing of the foil surface could also, for example, be achieved by simply abrading or indenting the surface with an abrasive material (such as, for example, emery paper or the like) of a suitably fine grain size. For instance, pressing a foil between two sheets of fine grain emery cloth can produce sufficient texture by indentation.

If desired, the surface emissivity of the various foil materials, such as nickel-chromium alloys, may be enhanced by oxidation in the manner discussed in International Patent No. WO 90/14580. For example, oxidised Ni80/Cr20 foil has a high emissivity, reported to be 0.9 at a wavelength of 0.65 mm and 0.85 at a wavelength of 1 mm and 0.8 at a wavelength of 5 mm, at a temperature of 1300° K. Similarly, oxidised stainless steel is very nearly a grey emitter (a grey emitter being one for which emissivity is independent of wavelength) having an emissivity of 0.8, 0.8 and 0.7 at wave lengths of 0.65, 1 and 5 microns respectively at 1200° K.

The range of materials which may be used for the element is extended by using a high emissivity surface coating such as a metal black. For instance platinum metal black is stable up to 950° C. As a general rule, a metal black may be operated to produce infra-red radiation up to a temperature of about half its melting point. In his respect molybdenum (melting point 2622° C.) and zirconium (melting point 1857° C.) are useful alternatives to platinum.

A further feature of metal black coatings is that should the metal black be overheated inadvertently, it either reconverts to the lower emissivity normal metal or is oxidised in the process (depending on the metal used, e.g. platinum will not be oxidised).

For a metal black of nickel or zirconium, for example, overheating produces the oxide, both of which have a high emissivity. In the case of zirconium, the broad-band emissivity of the oxide does not appear to be much less than the black of that metal, which is convenient if excessive heating causes degradation of the metal black to occur.

It will be appreciated tat for the various types of surface coatings that may be used the spectral features will differ from substance to substance. For example, zirconium oxide has spectral features giving a strong maximum at about 2.8 $\mu$m, with smaller peaks at 4.3 $\mu$m and 5.4 $\mu$m, at 500° C. A coating of magnesium oxide has two wide bands with peaks at 3 $\mu$m and 5.3 $\mu$m, with a smaller band at 2.1 $\mu$m. Yttrium oxide, in contrast, shows several maxima, of which the principal ones lie at 3 μm and 6.9 μm.

Broad band oxide infra-red emitters include zinc, lead, manganese, ion, nickel, chromium, copper, tin, calcium, erbium, cerium, uranium, beryllium, aluminium amongst others. For instance in the case of calcium oxide, sharp maxima occur at is 2.75 μm and 4.75 μm and a relatively high value of emissivity at 8 μm. Mixtures of oxides may be used as in the Nernst glower (e.g. a sintered mixture of zirconium, yttrium, thorium and certain other oxides).

Other materials that may be used for surface coatings include tricalcium phosphate (which has emission peaks at 2.85 μm and 4.75 μm), calcium carbonate (which has a broad band response peaking in the range of 3 μm to 4 μm), calcium sulphate (which has several emission peaks, the strongest occurring at 4.65 μm and about 1 μm wide). Silicon carbide may also be used, as in Globar radiators.

Silicates of many substances may also be used (e.g. $NaAlSi_3O_8$ or $CaSiO_3$). Silicates share a common feature of an emission band at 2.88 μm, which is frequently relatively sharp, and close to 0.5 μm wide.

The above examples of materials which may be used for the foil are by no means exhaustive but represent a cross-section of the commercially available materials which indicate the diversity of materials available. In addition, it will be seen that in most cases a compromise between various physical parameters must be reached and different materials may be more or less suited for elements intended for use in different applications. However, from the examples given it will be evident that it will be possible to match spectral features of the various foils for specific uses such as spectroscopic methods of detection of particular gases.

I claim:

1. An infra-red (IR) radiation emitting device, comprising a resistive element which emits IR radiation when heated by an electric current, the device being adapted to emit radiation with a spatial intensity which substantially possesses a single axis, wherein the resistive element comprises a sinuous metal foil ribbon which lies in substantially the same plane along substantially all of its length.

2. A device according to claim 1, wherein the sinuous ribbon element is linked to a support structure via two or more supporting electrodes which conduct current to and from the element, each end of the ribbon having at least one electrode associated therewith.

3. A device according to claim 2, wherein said supporting electrodes are foil electrodes formed integrally with the sinuous ribbon element.

4. A device according to claim 2, wherein the supporting electrodes are electrically connected to a current supply at said supporting structure.

5. A device according to claim 2, wherein the or each supporting electrode associated with each end of the sinuous ribbon element is formed integrally with a respective foil support element each of which is fixed to said support structure and electrically connected to the current supply.

6. A device according to claim 2, wherein the support structure is electrically insulated.

7. A device according to claim 2, wherein said electrodes are configured as support legs whereby a plurality of the devices may be combined in a compact array.

8. A device according to claim 2, comprising four of said supporting electrodes.

9. A device according to claim 1, wherein the sinuous ribbon element is spiralled.

10. A device according to claim 1, wherein a reflective member is positioned on one side of the sinuous ribbon element to reflect IR radiation emitted from one side of element back in the general direction of the radiation emitted from the other side of the element.

11. A device according to claim 1, wherein at least a portion of the surface of the foil ribbon is textured to increase its emissivity.

12. A device according to claim 1, wherein the foil material is provided with a coating of high thermal emissivity.

13. A device according to claim 12, wherein said coating is a metal black.

14. A device according to claim 12, wherein said coating is an oxide or silicate, or a mixture thereof.

15. A method of fabricating an infra-red radiation emitting device, comprising etching or otherwise cutting one or more sinuous resistive ribbon elements from a thin sheet of electrically conducting foil that provides a source of infra-red radiation when heated by an applied electric current.

16. An infra-red (IR) radiation emitting device, comprising a resistive element which emits IR radiation when heated by an electric current, the device being adapted to emit radiation with a spatial intensity which substantially possesses a single axis, where the resistive element comprises a sinuous metal foil ribbon which lies in substantially the same plane along substantially all of its length, and wherein the sinuous ribbon element is linked to a support structure via two or more supporting electrodes which conduct current to and from the element, each end of the ribbon having at least one electrode associated therewith, and wherein the temperature gradient along the electrodes decreases gradually in a direction away from the sinuous ribbon element, and wherein the supporting electrodes are elongate and taper outwardly away from the sinuous ribbon element.

17. An infra-red (IR) radiation emitting device, comprising a resistive element which emits IR radiation when heated by an electric current, the device being adapted to emit radiation with a spatial intensity which substantially possesses a single axis, where the resistive element comprises a sinuous metal foil ribbon which lies in substantially the same plane along substantially all of its length, and wherein the sinuous ribbon element is a bi-spiral.

* * * * *

UNITED STATES PATENT AND TRADEMARK OFFICE
CERTIFICATE OF CORRECTION

PATENT NO. : 5,864,144
DATED : January 26, 1999
INVENTOR(S) : Derek Charles Laine It is certified that error appears in the above-identified patent and that said Letters Patent is hereby corrected as shown below:

In column 1, line 31, please change the word "tick" to --thick--.

In column 1, line 37, please change the word "tin" to --thin--.

In column 1, line 55, please change the word "Ro khan" to --Bokhan--.

In column 2, line 42, please change the word "beating" to --heating--.

In column 3, line 30, please change the word "blacks" to --black--.

In column 4, line 22, please insert a --/-- between the words "ion" and "electron".

In column 5, line 65, please change the word "tan" to --than--.

In column 6, line 49, please change the word "being" to --bearing--.

In column 7, line 9, please change the word "mate" to --made--.

In column 8, line 67, in the formula, please change "Y" to --$T^4$--.

In column 9, line 3, please change "Y" to --T--.

In column 9, line 36, please change "nm" to --mm--.

In column 9, line 40, please change "nm" to --mm--.

Signed and Sealed this

Sixth Day of July, 1999

Q. TODD DICKINSON

*Attest:*

*Attesting Officer*    Acting Commissioner of Patents and Trademarks